United States Patent
Lucidarme et al.

(10) Patent No.: US 10,288,425 B2
(45) Date of Patent: May 14, 2019

(54) GENERATION OF MAP DATA

(75) Inventors: Philippe Lucidarme, Angers (FR); Sebastien Lagrange, La Meignanne (FR)

(73) Assignee: UNIVERSITE D'ANGERS, Angers (FR)

( * ) Notice: Subject to any disclaimer, the term of this patent is extended or adjusted under 35 U.S.C. 154(b) by 1140 days.

(21) Appl. No.: 14/128,948

(22) PCT Filed: Jun. 22, 2012

(86) PCT No.: PCT/FR2012/051427
§ 371 (c)(1),
(2), (4) Date: Dec. 23, 2013

(87) PCT Pub. No.: WO2012/175888
PCT Pub. Date: Dec. 27, 2012

(65) Prior Publication Data
US 2014/0142891 A1   May 22, 2014

(30) Foreign Application Priority Data
Jun. 24, 2011   (FR) ..................... 11 55625

(51) Int. Cl.
*G05D 1/02* (2006.01)
*G01C 15/00* (2006.01)

(52) U.S. Cl.
CPC ........... *G01C 15/002* (2013.01); *G05D 1/024* (2013.01); *G05D 1/0274* (2013.01)

(58) Field of Classification Search
CPC .... G05D 1/0272; G05D 1/027; G05D 1/0234; G05D 1/024; G05D 1/0274; G01C 15/002
(Continued)

(56) References Cited

U.S. PATENT DOCUMENTS

2005/0234679 A1* 10/2005 Karlsson .............. G05D 1/0272
  702/181
2006/0293810 A1* 12/2006 Nakamoto ........... G05D 1/0234
  701/28
(Continued)

OTHER PUBLICATIONS

May et al., "3D Pose Estimation and Mapping with Time-of-Flight Cameras," retrieved from internet website: www.robotic.de/fileadmin/robotic/fuchs/iros08_3dcam/pdf, pp. 1-6 (Jan. 1, 2008).
(Continued)

*Primary Examiner* — Andrew Schechter
*Assistant Examiner* — Kaleria Knox
(74) *Attorney, Agent, or Firm* — Drinker Biddle & Reath LLP (57) ABSTRACT

A measurement instrument, i.e. a mobile body, measures distances between a current position of the mobile body and obstacles in the environment of the mobile body by: a) taking at least N measurements of distances between the mobile body and the obstacles, by consecutive angular steps of A/N (A is a predetermined angular sector), and combining the distances with the respective angular steps in order to establish map data; b) moving the mobile body and repeating step a) for a new current position of the mobile body; and c) simultaneously determining, according to the distances measured for each angular step of the current position of step b) and the preceding position of step a), the current position of the mobile body in step b) on the map relative to the initial position thereof in step a), and new data of the map.

10 Claims, 5 Drawing Sheets

(58) Field of Classification Search
USPC .............................. 702/181; 700/251; 701/28
See application file for complete search history.

(56) References Cited

U.S. PATENT DOCUMENTS

| | | |
|---|---|---|
| 2007/0293985 A1 | 12/2007 | Myeong et al. |
| 2009/0292394 A1* | 11/2009 | Hyung ................... G05D 1/027 |
| | | 700/251 |
| 2010/0152944 A1* | 6/2010 | Kouno ................... G05D 1/024 |
| | | 701/26 |
| 2010/0235033 A1* | 9/2010 | Yamamoto ............. G05D 1/024 |
| | | 701/26 |

OTHER PUBLICATIONS

Nuechter et al., "6D SLAM—3D Mapping Outdoor Environments," Journal of Field Robotics, John Wiley & Sons, Inc., US, vol. 24(8-9), pp. 699-722 (Aug. 1, 2007).

Thrun et al., "Stanley: the Robot that Won the DARPA Grand Challenge," Journal of Field Robotics, John Wiley & Sons, Inc., US, vol. 23(9), pp. 661-692 (Sep. 1, 2006).

* cited by examiner

GENERATION OF MAP DATA

CROSS-REFERENCE TO RELATED APPLICATIONS

This application is the U.S. national phase of the International Patent Application No. PCT/FR2012/051427 filed Jun. 22, 2012, which claims the benefit of French Application No. 1155625 filed Jun. 24, 2011, the entire content of which is incorporated herein by reference.

FIELD

The present invention relates to the generation of cartographic data.

BACKGROUND

Provision may typically be made for one or more mobile measurement instruments (for example robots), designed to measure distances between their current position and obstacles in their environment. In what follows, the term "mobile" is understood as meaning a mobile measurement instrument of the aforementioned type. These measurements can for example be performed by measurements of flight time ("LIDAR" teledetection in particular, for "Light Detection and Ranging"), or by any other technique making it possible to measure a distance.

There arises in particular the problem, in real time, referred to as onboard "SLAM" (for "Simultaneous Localization And Mapping"), which consists in having to determine at one and the same time the cartographic mapping and the location of the mobile measurement instrument. Thus, it is necessary to construct a map of the environment of the measurement instrument and at the same time locate this instrument in this map. In practice, these two problems cannot be solved independently. In order for a mobile instrument to be able to establish a map of the environment, the instrument must firstly be in possession of the information relating to the point from where its distance measurements were made. In the same manner, it is difficult to estimate the current position of the instrument without a well-established map. Thus, a good map is necessary in order to self locate, whereas precise estimation of the current position is necessary in order to construct the map.

To describe the objectives aimed at in a more illustrative manner by way of example:
 at the input of a mapping system, it is sought to establish the coordinates of the entities to be mapped (walls, doors, furniture, trees, etc.) in the form of points or of clouds of points expressed in a reference frame bound to the mobile instrument, and
 at the output of the system, an instantaneous position of the instrument is determined (for example the coordinates X, Y, θ for a plane problem, that is to say for the establishment of a map in 2D),
 a sampled map of the environment explored is established therefrom.

Still by way of illustrative example, in a plane problem, an algorithm updates the map and the position of the instrument (referred to as a "mobile" hereinbelow), in less than 25 ms on an eeePC computer with 1.6 GHz processor clock. The position of the mobile is expressed in the continuous domain, whereas the map is sampled spatially with an interval of 20 mm, for example.

A few SLAM solution methods are currently known.

"Visual SLAM" uses one or more image acquisition systems (generally cameras) and calculates the transformation between two successive images so as to deduce therefrom the displacement of the mobile.

However, these approaches require preprocessing of the video data, which is often hardly compatible with real-time constraints.

The acquisition systems are subject to the lighting conditions, and this may falsify or prevent the location process.

The reconstruction of the map is often difficult on the basis of video images, and one often resorts to a combination with a LIDAR for mapping.

The extraction of "landmarks" consists in extracting from the data of sensors (camera, LIDAR, or other) zones of interest, called "landmarks", to use them as natural signposts.

However, this is an expensive process, in the same way as image processing.

The extraction possibly being subject to disturbances, this type of approach is generally combined with a stochastic approach (of the type using for example Kalmann filters, as described hereinbelow).

The absence of a landmark in a current field of vision prevents any location.

The approach using Kalmann filters consists in fusing the information originating from several sensors (LIDAR and odometry for example) by using probabilistic models. However, the underlying mathematical models may be complex and they require highly-tuned knowledge of the characteristics of the sensors, in particular the variances in the uncertainty of the measurements. This variance may be difficult to estimate and may also be subject to variations (in particular of the odometric measurements when passing from rough terrain to slippery ground).

The approach using "particle filters" is akin to the so-called Monte Carlo schemes which perform a series of random draws with the final objective of keeping the best.

In practice however, this technique gives poor results if it is not combined with another algorithm.

Depending on the chosen number of particles (on which the quality of the result will depend), compatibility with the real-time constraint is difficult.

Moreover, like any technique using random draws, the results are not reproducible.

The so-called "ICP" ("Iterative Closest Point") technique consists in associating each LIDAR point with data acquired previously so as to estimate the transformation by a processing of the "least squares" type.

However, the process of matching corresponding points is extremely expensive resource-wise and its complexity is of the order of O(n.log(n)), thereby prohibiting real-time execution in practice.

Furthermore, these schemes are not robust in relation to aberrant data.

SUMMARY

The present invention improves the situation.

It proposes for this purpose a method for generating cartographic data, in which at least one, mobile, measurement instrument is designed to measure distances between a current position of the mobile and obstacles in an environment of the mobile, comprising the steps:
 a) performing at least N measurements of distances between the mobile and obstacles in said environment, by successive angular intervals of A/N each, where A is a predetermined angular sector defining at least partially said environment of the mobile, and associating said distances with the respective angular intervals in a work memory, to establish map data, b) displacing the mobile and repeating step a) for a new current position of the mobile, and c) determining, as a function of the distances measured for each angular interval of the current position of step b) and of the previous position of step a), at one and the same time:
the current position of the mobile in step b), on said map, with respect to its initial position in step a), and
new data of said map.

In particular, in step c):
a function of global distance between the mobile and first neighbors of the mobile, with respect to the map determined in step a), is determined, and
a local minimum of said function is charted, characterizing a current position of the mobile in step b).

Figure 7:
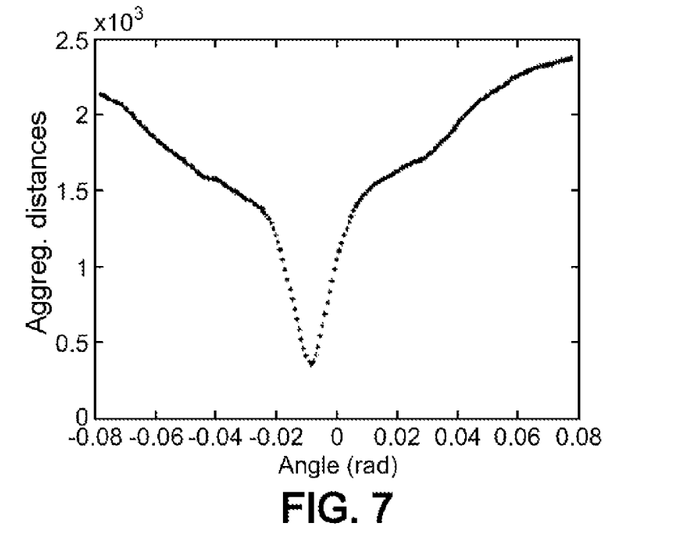
FIG. 7 illustrates the local minimum of the aforementioned global distance function, FIG. 8 schematically illustrates a device MOB1 for the implementation of the method within the meaning of the invention.

As will be seen further on with reference to FIG. 7 illustrating a variation of this function, a local minimum in this variation is charted and this minimum then characterizes a current position of the mobile with respect to the obstacles of its environment, in the guise of first neighbors.

According to one of the advantages afforded by the invention and in contradistinction to the techniques presented hereinabove, the method which is the subject of the invention requires very few calculations (by virtue in particular of the search for the local minimum in the aforementioned distance function variation, as will be seen further on), and displays noteworthy performance in terms of execution time. The simplicity of the processing allows it to operate on modest processors and, consequently, can today be the subject of onboard technology. The quality of the results and especially the robustness to disturbances afford it a major advantage.

Advantageously, the method can furthermore comprise a step d) of successive reiterations of steps b) and c) to establish a map of at least one object or building. For example, there is provision for a step d) of successive reiterations of steps b) and c) to determine all the obstacles in the environment of the mobile and thus establish a complete map of at least one object in the environment of the mobile, or of a building in which the mobile is placed.

In step a), the map data are established as a function of an indication of the current position of the mobile in step a), and the method then preferably comprises an initial step $a_0$) of determining the absolute position of the mobile in space.

Advantageously for the establishment of a 2D map, the global distance function exhibits a single local minimum, corresponding, for the establishment of a two-dimensional map, to two cartesian coordinates X, Y, and an angle θ defining an orientation of the mobile in a plane in step b). Such an embodiment makes it possible to determine the new position of the mobile in a plane for the establishment of the 2D map in this plane.

Advantageously for the establishment of a 3D map, the global distance function exhibits a single local minimum, corresponding, for the establishment of a map in three-dimensional space, to three cartesian coordinates X, Y, Z, and three angles θ, ψ, φ together defining an orientation of the mobile in space in step b). Such an embodiment makes it possible to determine the new position of the mobile in space for the establishment of the aforementioned 3D map.

In one embodiment, the global distance function is estimated by a sum of euclidian distances between an obstacle point determined in step a) and a neighboring point, detected as obstacle in step b).

In one embodiment:
a (for example) look-up table is established beforehand for the correspondence between neighboring points of a central point and estimated euclidian distances between this central point and its neighbors,
for the calculation of the global distance function, after detection of obstacles in step b), for each obstacle, a distance with the closest obstacle point, determined in step a), is determined and said look-up table is referred to in order to determine a euclidian distance between the obstacle and a closer neighbor,
said sum of the euclidian distances, for all the obstacle points, is estimated thereafter.

Thus, in this embodiment, the aforementioned minimum of the sum of distances corresponds to an orientation and a distance of displacement of the mobile, and, after determination of this minimum, a new position of the mobile and new map data are advantageously determined.

The present invention is also aimed at a computer program, comprising instructions for the implementation of the method hereinabove, when it is executed by a processor. An exemplary flowchart of the general algorithm of such a program is presented in FIG. 2 appended hereto and commented on in detail in the description detailed hereinbelow.

BRIEF DESCRIPTION OF THE DRAWINGS

Other advantages and characteristics of the invention will become apparent on reading the description detailed hereinbelow given by way of wholly non-limiting possible exemplary embodiment, and appended drawings in which.

DETAILED DESCRIPTION

Figure 1:
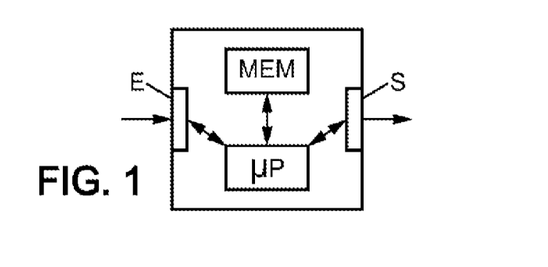
FIG. 1 is an exemplary item of equipment comprising a calculation unit for the formulation of a map on the basis of measurement data produced by a mobile.

With reference to FIG. 1, the invention can be implemented on any item of equipment possessing or emulating:
a data input device E,
a results retrieval device S,
a memory MEM (containing the maps data and position data),
an arithmetic and logic calculation unit µP.

Possible exemplary embodiments are systems derived from Von Neumann architectures (microcontroller, microprocessor, PC or others) and programmable logic architectures (such as ASICs, FPGAs, CPLDs and others).

Thus, the inputs to the device E are the data representing the neighboring environment around the mobile to be located. These data can originate from various sensors (LIDAR for example), and are transformable into cartesian coordinates of points of space indicating the presence of an object to be cataloged in the map, or else of a free zone. These coordinates are expressed in a reference frame bound to the mobile to be located.

Denoting by e the input of the system representing the coordinates of the entities to be mapped (in the form of clouds of points), in the general case, we have:

$$e_i = [\vec{P}_t, \vec{S}]_{Mobile}$$

where:
$e_i$ is the $i^{th}$ input of the system,
$\vec{P}_t$ is the vector of coordinates of points,
$\vec{S}$ is the vector relating to the status of each point (occupied/free).

In the case of a plane problem (determination of a 2D map), we have:

$$e = \begin{bmatrix} X_0 & Y_0 & S_0 \\ X_1 & Y_1 & S1 \\ \vdots & \vdots & \vdots \\ X_n & Y_n & S_n \end{bmatrix}_{Mobile}$$

where $X_0$, $Y_0$ are the coordinates of the points (arising from a LIDAR for example) expressed in the reference frame of the mobile. Indeed, acquisition systems compatible with a technique within the meaning of the invention are telemeters such as for example based on LASER scanning (of LIDAR type in particular), for 2D mapping.

The outputs of the system [PV] are given in two forms:
P: position data of the mobile in an absolute reference frame;
V: map data of the zones explored in the form of a stochastic occupancy grid $V(\vec{C})$, each cell of the grid representing the probability of presence of an obstacle in the grid.

The position of the mobile is expressed in the form of coordinates in space including the position and the orientation of the mobile.

In the general case, we have:

$$P = [\vec{X}, \vec{O}]_{Absolute}$$

where:
P is the input of the system,
$\vec{X}$ is the position in space,
$\vec{O}$ is the orientation in space.

In the particular case of a plane problem (to establish a 2D map), we have:

$$P = [XY\Theta]_{Absolute} \text{ and } V(x,y) \text{ with } x,y \in N$$

When data to be processed are present in the input device, after a first series of measurements, the processing described hereinbelow makes it possible to update the position of the mobile, as well as the map of the environment.

Figure 2:
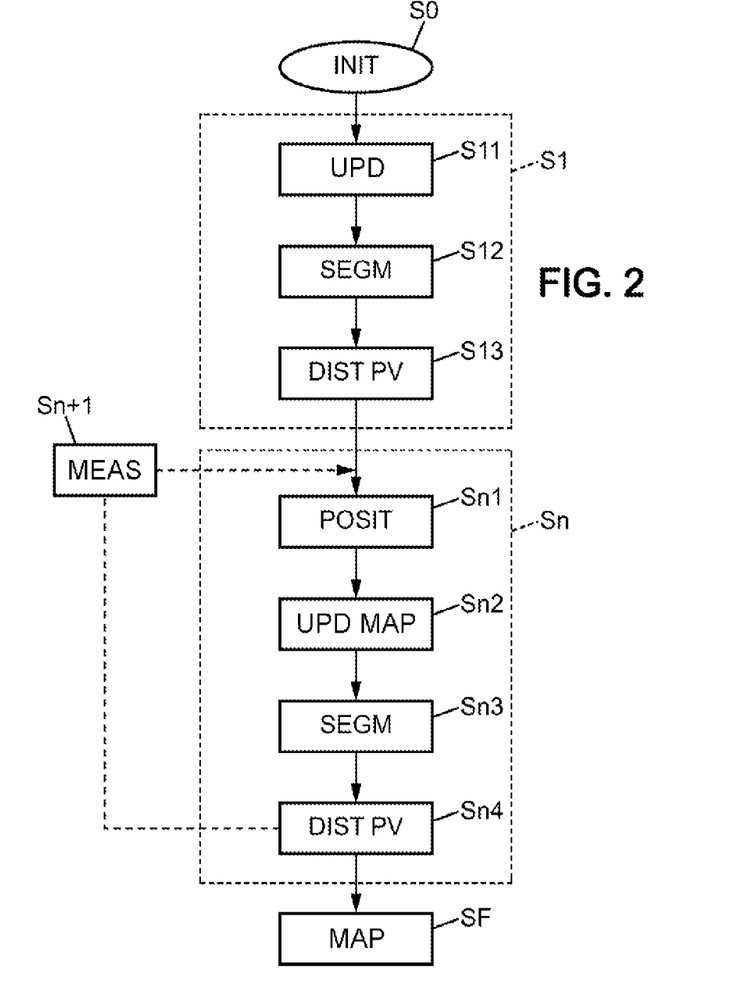
FIG. 2 illustrates an exemplary flowchart of the steps of a method within the meaning of the invention.

However, the first iteration must be processed differently so as to initialize the processing, as follows, with reference to FIG. 2.

After an initialization command S0, in the course of which a first series of measurements is then performed, a first iteration of a set S1 of steps is aimed at initializing the processing and writing the first information to the environment map, which information will serve as reference hereinbelow in the processing.

This set S1 consists of three steps:
an updating S11 of the map,
a segmentation S12 of the map, and
a calculation S13 of the distances to the closest neighbor.

In step S11, the initial position of the mobile is assumed known. It is possible to assume for example that this initial position is zero. A variable corresponding to the position of the mobile represents this initial position, for example:
for a 2D map, in a plane, with the position variables: X, Y, $\Theta$
or for a 3D map, in space, with the position variables: X, Y, Z, $\varphi$, $\psi$ and $\Theta$.

Knowing the position of the mobile and on the basis of the position of the measurement points to be cataloged $e_o$ in the map, we calculate for each point the associated cell $V(\vec{C})$ so as to update its value. In the case of a measurement instrument of LIDAR type for example, the coordinates of the cell are given, for a 2D mapping, by:

$$X_{mobile} = \frac{\text{Distance} * \cos(\text{Alpha})}{STEP_{MAP}}$$

$$Y_{mobile} = \frac{\text{Distance} * \sin(\text{Alpha})}{STEP_{MAP}}$$

$$\begin{bmatrix} x \\ y \end{bmatrix}_{absolute} = \left\| \begin{bmatrix} \cos(R_z) & -\sin(R_z) \\ \sin(R_z) & \cos(R_z) \end{bmatrix} - \begin{bmatrix} X_{mobile} \\ Y_{mobile} \end{bmatrix} + \begin{bmatrix} T_x \\ T_y \end{bmatrix} \right\|$$

where:
Xmobile, Ymobile are the coordinates of the point in the reference frame tied to the mobile,
the variable Distance is the distance measured with the lidar for the current point,
the variable Alpha corresponds to the angle of measurement of the current point,
the variable STEPMAP corresponds to the width of a cell of the map,
the vector [Tx, Ty] corresponds to the assumed translation of the mobile with respect to the origin of the map,
Rz is the assumed orientation of the mobile with respect to the origin of the map,
x, y are integer numbers corresponding to the indices of the cell to be updated.

Several updating schemes can be envisaged for the implementation of step S11. This may involve a binary, mean, or else baysian mean scheme.

An iterative mean can for example be adopted, as illustrated in the equation hereinbelow:

$$V_i(\vec{C}) = (1 - \alpha) \cdot V_{i-1}(\vec{C}) + \alpha \cdot S_i$$

$$\alpha = \frac{1}{1 + \text{Visit}(\vec{C})}$$

Bounding the number of visits makes it possible to insert a forget factor, thereby advantageously according more importance to recent acquisitions, as follows:

$$\text{Visit}_B(\vec{C}) = \min(Cst, \text{Visit}(\vec{C}))$$

A simple and effective solution consists in adding or subtracting a constant to or from the previous value depending on whether the cell is free or occupied.

Figure 3A:
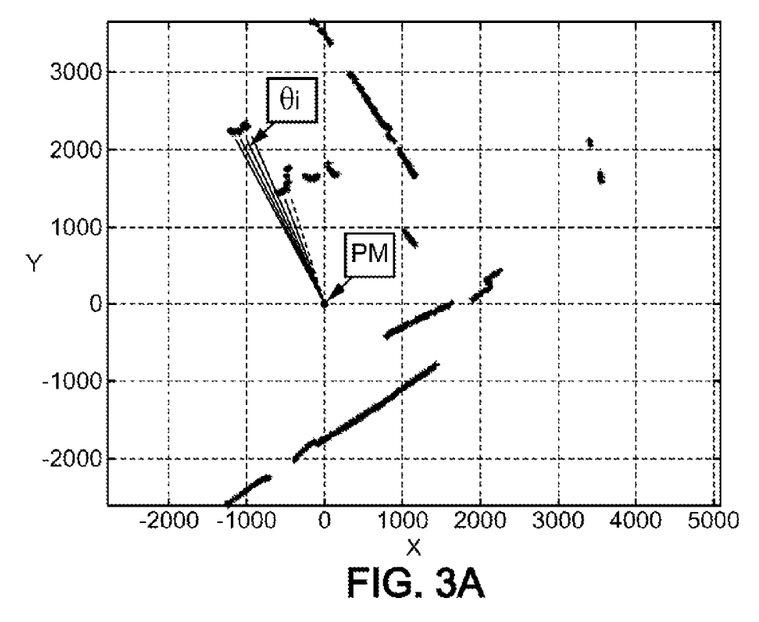
FIG. 3A represents measurement points plotted by the mobile.

The following step S12 consists in segmenting the stochastic map so as to transform it into a second binary map named $V_S(\vec{C})$: each cell of the new map comprises only two states: empty or occupied. Several segmentation techniques can be envisaged, but a simple thresholding of the values is in practice satisfactory. Represented in FIG. 3A is an exemplary embodiment, for a 2D mapping, of a segmentation by angular intervals $\theta_i$ (with i=1, ..., N for N angular intervals in all), around an initial position of the mobile PM. Of course the black points illustrate the obstacle points. When an entire angular sector A has been scanned, a new updated map is ultimately obtained, as illustrated in FIG. 3B.

Advantageously, it is possible to refer to an indication of absolute position of the mobile in space to determine the map data obtained in an absolute reference frame.

Figure 3B:
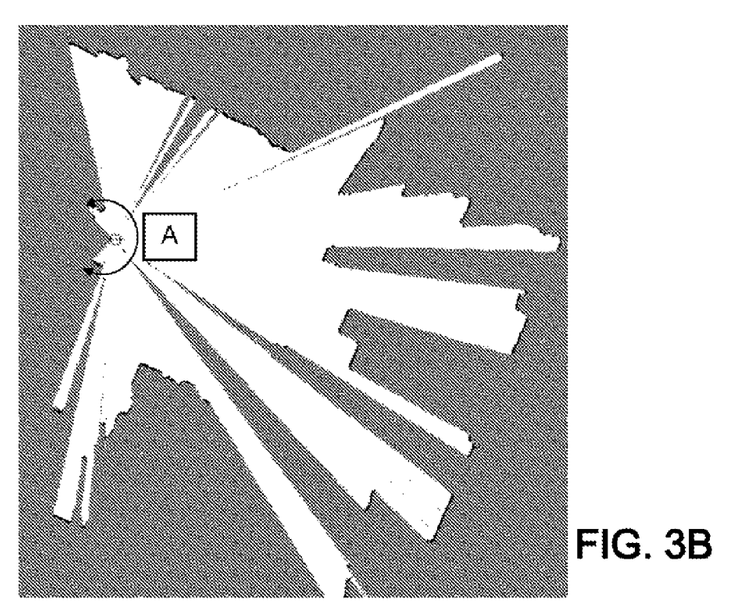
FIG. 3B represents a first map formulated on the basis of the measurement points of FIG. 3A.

The following step S13 corresponds to the calculation of the distances to the closest neighbor of the map elements cataloged in accordance with the first series of measurements according to FIG. 3A or 3B. With each empty cell of the map is associated a value representing the bounded distance to the closest neighbor, as follows:

$$V_d(\vec{C}) = \min(D_{ppv}, D_{max})$$

with:
- $V_d(\vec{C})$, the euclidian distance associated with the cell of index $\vec{C}$,
- Dppv, the euclidian distance with the closest occupied cell,
- Dmax, the maximum euclidian distance of displacement of a point between two successive acquisitions.

Figure 4:
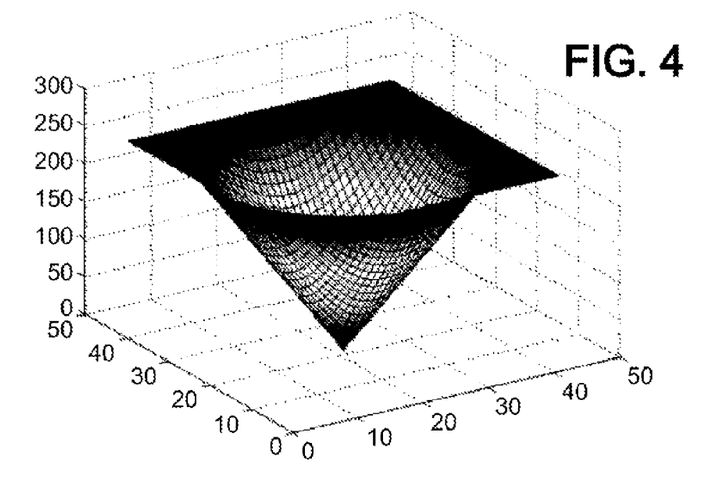
FIG. 4 illustrates the precalculated distances between a point and its first neighbors.

An advantageous operation for accelerating the processing, in particular for the distance calculation, consists in using a precalculated table (of LUT type, for "Look-Up Table"), loaded into memory and containing, for a given point, a set of precalculated distances from this point, as illustrated in FIG. 4 presenting a cone (of increasing distances) on receding from a central point, the vertex of the cone. This precaution makes it possible advantageously not to have to calculate the euclidian distances (involving in particular calculations of square roots) between neighbors of a given point.

Figure 5:
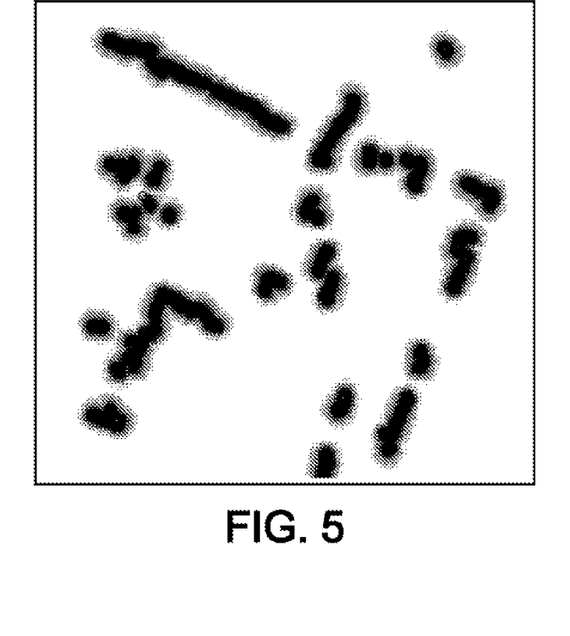
FIG. 5 illustrates the precalculated distances between each point of FIG. 3A and its first neighbors.

The segmented map after calculation of the distances has been represented in FIG. 5. The white cells are cells which have their closest neighbor a distance away greater than the maximum displacement $D_{max}$. The black cells are the occupied cells (with a zero distance, since they are their closest neighbor). The remaining cells are the cells with a distance lying between 0 and $D_{max}$, the gray level reflecting the distance to the closest neighbor.

Steps S11 to S13 are presented here in a sequential manner by way of illustrative example, but they may be executed in parallel or processed point by point.

Thus, in the example hereinabove, in summary, for each point, the cell $V(\vec{C})$ concerned in regard to this point is firstly updated and the cell $V_S(\vec{C})$ of the corresponding second map is updated. The distances $V_d(\vec{C})$ of the neighbors of the same cell are calculated thereafter. Next, we go to the next point, until the measurement points of the map of FIG. 3A or 3B are exhausted.

A second series of measurements is performed thereafter and we explain hereinbelow how, starting from the estimated distances as illustrated in FIG. 5, we determine at one and the same time:
- a displacement of the measurement instrument, and
- new data of the map.

For a following iteration, and more generally for the following iterations of the processing, the position of the mobile is estimated and thereafter the map data is updated relying on this estimation. Thus, with reference again to FIG. 2, a group of current steps Sn comprises:
- a step Sn1 of estimating the position of the mobile,
- a step Sn2 of updating the map,
- a step Sn3 of segmenting the map, and
- a step Sn4 of calculating the distances to the closest neighbor.

This step Sn1 yields a map $V_d(\vec{C})$ in the guise of a model representing the explored space including the distances to the closest occupied neighbors. When a new suite of measurement data ei is present on the input device E, this suite being called a "scene" here, the processing searches for the best corresponding match between the map model and this scene.

For an assumed position of the mobile, for each point of ei the associated cell is calculated so as to estimate the sum of the distances thereof. Concerning the position of the mobile, it is indicated that it is possible to initialize the processing with the best known position and which consists of the position estimated at the previous iteration. However, in one embodiment, this estimation may optionally be improved with a measurement arising from another sensor (by odometry for example).

Figure 6A:
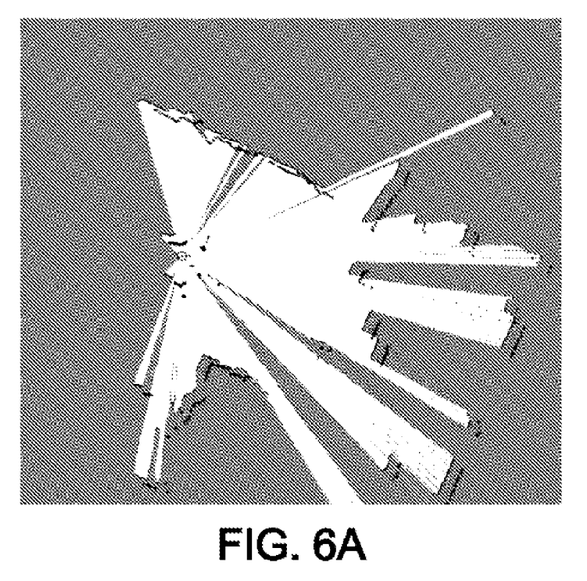
FIG. 6A illustrates new measurement data for superposed points on the map of FIG. 3B.

Thus, by relying on the estimated position, the position is calculated of each measurement point arising from the last acquisition, in the reference frame of the map devised at the previous step (FIG. 3B for example). These points are then obtained, superposed on the map obtained at the previous iteration, as represented in FIG. 6A. For each point arising from the last measurement, its distance, determined as indicated previously with reference to FIG. 5, to the closest neighbor is calculated thereafter, by thus utilizing the enriched information of the map such as represented with the estimations of distances in accordance with FIG. 5. For each new point ei, the distance to its first neighbor is aggregated. A variable representing the sum of the distances to the first neighbors is then obtained. This sum may be akin to the sum of least squares conventionally used in numerical analysis. This processing makes it possible to describe a mathematical function of which a local minimum is sought.

The sum of the aforementioned distances then becomes a criterion to be minimized. Indeed if the sum of the distances is zero, the scene corresponds perfectly to the model. On the other hand, if the sum of the distances is large, then the model and the scene are far apart. If the scene and the model agree to within a distance $D_{max}$, then the transformation between the two properly reflects a displacement of the mobile.

Figure 6B:
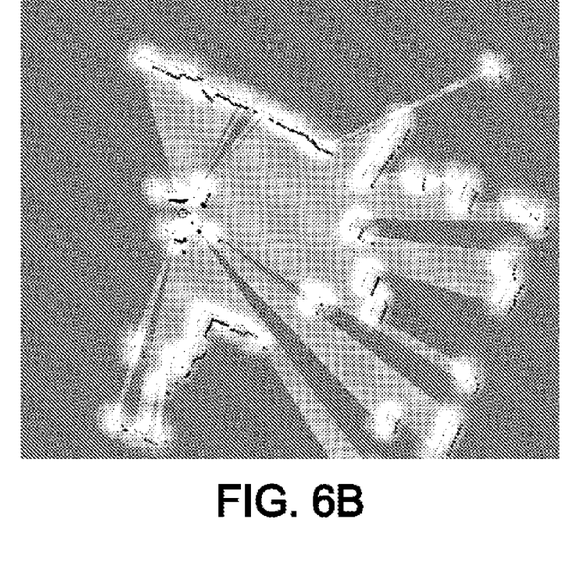
FIG. 6B illustrates a superposition of the new measurement points at the precalculated distances of FIG. 5.

Represented in this FIG. 6B is an illustration of the scene ei (points) overlaid onto the model $V_d(\vec{C})$ (of FIG. 5).

A mathematical function Criterion=$f$(P) to be minimized is then defined. In the plane for a 2D map, the function is expressed in the form Criterion=$f$(X,Y,θ).

According to a principle of the present invention, it is shown that $f$ is a function accepting local minima, as is illustrated in FIG. 7. This function is evaluatable, but its analytical expression is unknown.

It is apparent in particular that within the framework of the problem of SLAM and under certain conditions that are all fulfilled here, a local approach can be used and gives very good results. The local minimum is indeed the sought-after minimum if the assumption about the displacement of the mobile is sufficiently reliable. If it is assumed that, at the start of the processing, the information is sufficiently likely to initialize the processing, then the result of each iteration is likewise sufficiently reliable.

An example of plotting the function $f$ projected into the $\theta$ plane for a problem in two dimensions (2D mapping) has been represented in particular in FIG. 7. It is readily noted that the function accepts only one minimum locally. The same tendency has nonetheless been observed within the framework of a 3D mapping.

Provision may be made for a large number of possible minimum search algorithms. By way of example may be cited the algorithm of Nelder and Mead which has given good results here.

When the local minimum of the sum of distances has been found, the new position Pi of the mobile is consequently known. It is then possible to update the map data in memory at the following steps Sn2, Sn3 and Sn4, as explained hereinabove respectively for steps S11, S12 and S13.

Thus, in short, after a first acquisition such as that illustrated in FIG. 3A, a look-up table (LUT) is referred to in order to determine distances of first neighbors around the points arising from the first acquisition, as illustrated in FIG. 5. A next acquisition makes it possible to determine subsequent points, such as those which are superimposed, as illustrated in FIG. 6A, on the previously established map represented in FIG. 3B. By consulting the look-up table giving the distances of the closest neighbors (as illustrated in FIG. 6B), a global sum of the distances between the latterly acquired points and those of the previously established map is estimated, and a local minimum of this sum of distances is sought. In an advantageous manner, it is established that customarily only one local minimum exists (FIG. 7), so that the current position of the mobile in the map represented in FIG. 3B is given without ambiguity and it is then possible to identify new measurement points in the last acquisition so as to enrich the data of the map.

This processing, repeated at each new acquisition of data, makes it possible to solve the problem of SLAM, without using landmark extraction, random drawing, stochastic models (variance or others), or heavy processing (correspondence or "matching" of points of images, etc.). It is thus possible to achieve noteworthy performance in terms of calculation time.

With reference again to FIG. 2, of course, as long as the desired complete map is not established in the final step SF, a following series of measurements Sn+1 can be performed and the group of steps Sn can be repeated.

An advantage of the present invention is its speed of calculation, in particular on account of:
the use of precalculated tables for the map updating,
the use of a local search algorithm for the position estimation.

A second advantage is the precision obtained. The speedy processing of the data does indeed make it possible to update the maps in real time and consequently to use a large number of data. A statistical phenomenon then appears, which enhances the reliability of the system: an aberrant item of data is "drowned" among the valid data and influences the result only very little. Moreover, it can be corrected in large part at the following iterations.

A third advantage is its simplicity. The processing is independent of the models of measurement instrument or sensors used. It does not rely on a mathematical model that would have to be recalculated as a function of the applications, the motorization characteristics of the mobile or its sensors. Furthermore, the few parameters of the processing algorithm are directly related to physical considerations (precision and size of the map, maximum velocity of the mobile, maximum displacement, etc.) and are therefore easy to adjust.

The processing can also be used to locate a mobile in an absolute manner in the environment. Such an application, customarily called "global positioning" or "kidnapping", consists in placing the mobile at an unknown position in a known environment, the mobile having to self locate in an absolute manner in this environment. The invention allows such an application if the mobile has of course prior (even partial) map data for the environment in which it is placed.

Of course, the present invention applies equally well in 2D and in 3D. Furthermore, it is possible to also use the processing within the meaning of the invention for mapping, but also for object recognition. A building map can then be replaced, in such an application, with the establishment of a database of objects and the scanned acquisitions are then replaced with 3D (even partial) acquisitions of an object. Thus, another possible application of the invention relates to the recognition of 3D objects, by measurement of distances, with the aid of a mobile. The processing within the meaning of the invention has given good results, again with the observation of a (well marked) local minimum of the aforementioned global distance function.

Moreover, provision may be made for a plurality of measurement instruments suitable for communicating, each for at least one other instrument, its map data, so that a step of cross-checking the map data arising from various measurement instruments can be conducted. Such an embodiment makes it possible advantageously to exactly decrease the processing time by the number of mobiles participating in the formulation of a complete map.

Figure 8:
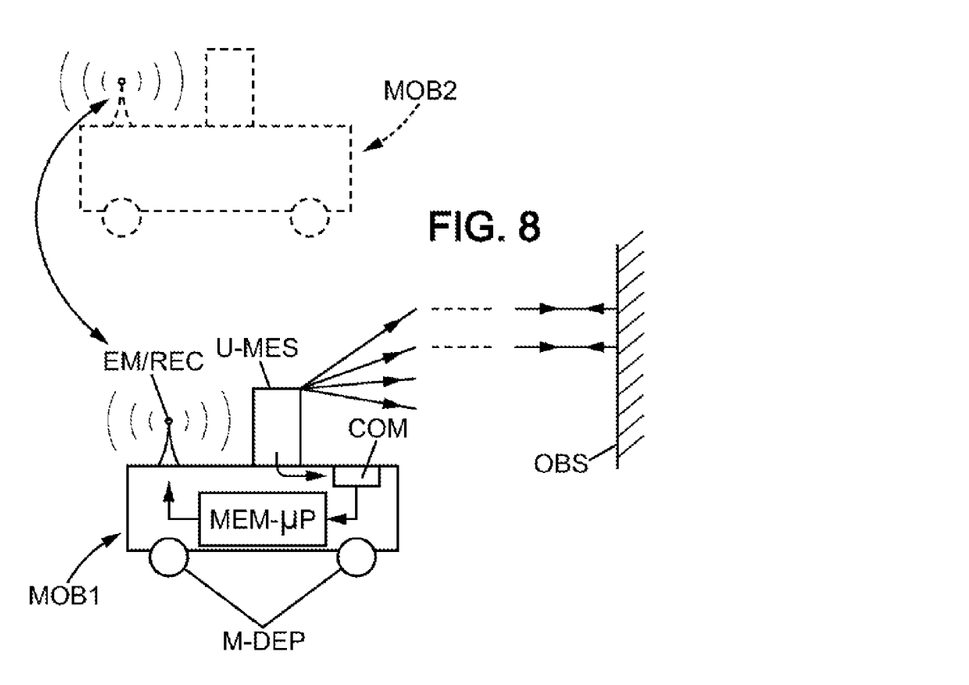

The present invention is also aimed at a device for generating cartographic data for the implementation of the method described hereinabove. With reference to FIG. 8, such a device comprises at least one mobile instrument, for measurements of distances to one or more obstacles OBS, comprising:
a unit for measurements of distances U-MES,
means of displacement of the instrument M-DEP, e.g., one or more wheels as shown in FIG. 8.
communication means COM for communicating the measured data to a unit for calculating map data and current position of the robot in this map, and
the aforementioned calculation unit.

In particular, the calculation unit MEM-μP comprises at least one processor μP and a work memory MEM for:
associating the measured distances with the respective angular measurement intervals in the work memory, and
determining, as a function of the distances measured for each angular interval of successive current positions, at one and the same time:
the last current position of the measurement instrument, on said map, and
new data of said map.

For this purpose, the minima of the global distance functions are advantageously charted as described hereinabove with reference to FIG. 7.

In the example of FIG. 8, the mobile measurement instrument integrates the aforementioned calculation unit. However, in a variant, the calculation unit may be separate (such as for example a unit PC connected to the measurement instrument by a wireless communication means).

Moreover, in the example of FIG. 8, the device MOB1 can furthermore comprise means of emission/reception EM/REC (for example by wireless communication) of map data that it can exchange with another device MOB2 for the formulation of a complete map of the aforementioned type, as indicated hereinabove.

The invention claimed is:

1. A method for generating cartographic data, in which at least one mobile device has a processor, means of displacement, and a measurement instrument designed to measure distances between a current position of the mobile device and obstacles in an environment of the mobile device, the method comprising the steps:
   a) performing, by the measurement instrument, at least N measurements of distances between the mobile device and obstacles in said environment, by successive angular intervals of A/N each, where A is a predetermined angular sector that defines at least partially said environment of the mobile device, and associating said distances with the respective angular intervals in a work memory of the mobile device by the processor, to establish map data of a map,
   b) displacing the mobile device using the means of displacement and repeating step a) for a new current position of the mobile device, and
   c) simultaneously i) determining, by the processor, as a function of the distances measured for each angular interval of the current position of step b) and of the previous position of step a), the current position of the mobile device in step b), on said map, with respect to its initial position in step a), and ii) generating, by the processor, new map data of said map as a function of the distances measured for each angular interval of the current position of step b) and of the previous position of step a),
   wherein step c) includes:
      estimating, by the processor, a function of global distance between the mobile device and the obstacles with respect to the map determined in step a) by a sum of Euclidian distances between each obstacle point determined in step a) and a neighboring point detected as an obstacle in step b), and
      determining, by the processor, a local minimum of said global distance function that corresponds to the current position of the mobile device in step b).

2. The method as claimed in claim 1, comprising a step d) of successive reiterations of steps b) and c) to establish a map of at least one object or building.

3. The method as claimed in claim 1, wherein, in step a), said map data are established as a function of an indication of the current position of the mobile device in step a), the method comprising an initial step $a_0$) of determining the absolute position of the mobile device in space.

4. The method as claimed in claim 1, wherein a plurality of measurement instruments suitable for communicating, each to at least one other measurement instrument, its map data, is provided, the method furthermore comprising a step of cross-checking by the processor of map data arising from various measurement instruments.

5. The method as claimed in claim 1, wherein the global distance function exhibits a single local minimum, corresponding, for the establishment of a two-dimensional map, to two cartesian coordinates X, Y, and an angle θ defining an orientation of the mobile device in a plane in step b).

6. The method as claimed in claim 1, wherein the global distance function exhibits a single local minimum, corresponding, for the establishment of a map in three-dimensional space, to three cartesian coordinates X, Y, Z, and three angles θ, ψ, φ together defining an orientation of the mobile device in space in step b).

7. The method as claimed in claim 1, wherein:
   a look-up table is established beforehand for the correspondence between neighboring points of a central point and estimated euclidian distances between this central point and its neighbors,
   for the estimation of the global distance function, after detection of obstacles in step b), for each obstacle, a distance with the closest obstacle point, determined in step a), is determined and said look-up table is referred to in order to determine a euclidian distance between the obstacle and a closer neighbor,
   said sum of the euclidian distances, for all the obstacle points, is estimated thereafter.

8. The method as claimed in claim 1, wherein the minimum of said sum of distances corresponds to an orientation and a distance of displacement of the mobile device, and, after determination of said minimum, a new position of the mobile device is determined and new map data is generated.

9. A non-transitory computer readable medium comprising computer program instructions for the implementation of the method as claimed in claim 1, when the instructions are executed by the processor.

10. A mobile device for generating cartographic data for the implementation of the method as claimed in claim 1, the mobile device comprising at least one measurement instrument, for measurements of distances, comprising:
   a unit for measurements of distances for the implementation of step a),
   means of displacement of the mobile device for the implementation of step b),
   means for communicating the measured data to a calculation unit for calculating map data and current position of the robot in said map, and
   said calculation unit,
   wherein said calculation unit comprises the processor and the work memory for:
   associating the measured distances with the respective angular measurement intervals in the work memory, and
   for the implementation of step c), simultaneously i) determining, as a function of the distances measured for each angular interval of successive current positions, the last current position of the measurement instrument, on said map, and ii) generating new map data of said map as a function of the distances measured for each angular interval of successive current positions,
   by estimating a function of global distance between the mobile device and the obstacles, with respect to the map determined in step a) by a sum of Euclidian distances between each obstacle point determined in step a) and a neighboring point detected as an obstacle in step b), and
   by determining a local minimum of said global distance function that corresponds to the current position of the mobile device in step b).

* * * * *